May 14, 1946.  J. ROSAN  2,400,318
INSERT
Filed Nov. 25, 1942  3 Sheets-Sheet 1
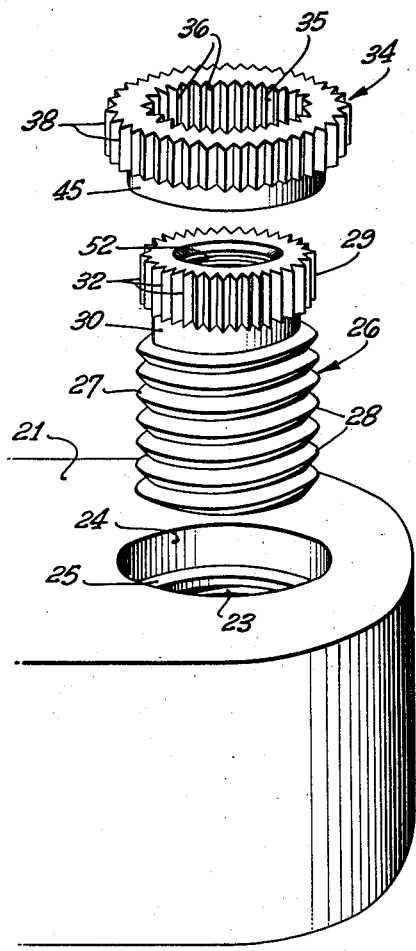
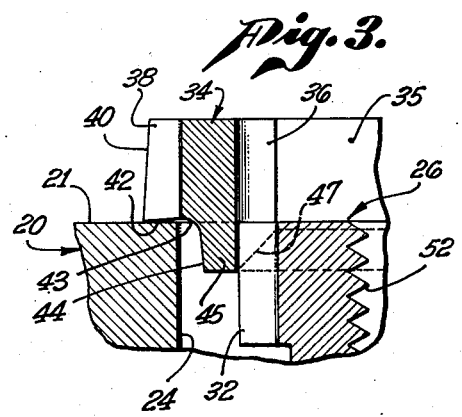
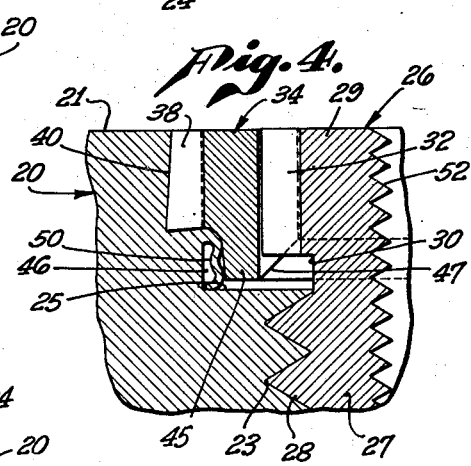
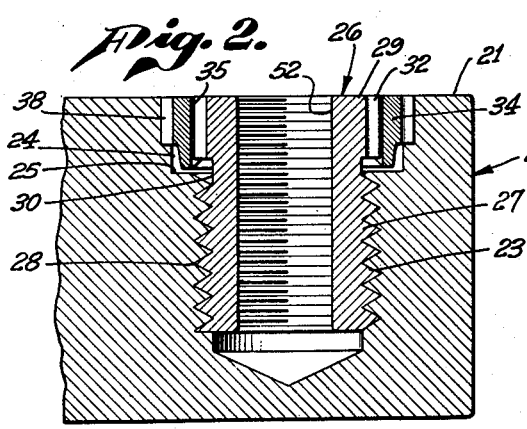
JOSEPH ROSAN,
INVENTOR.
BY
ATTORNEY.

JOSEPH ROSAN, INVENTOR.

May 14, 1946.   J. ROSAN   2,400,318
INSERT
Filed Nov. 25, 1942   3 Sheets-Sheet 3
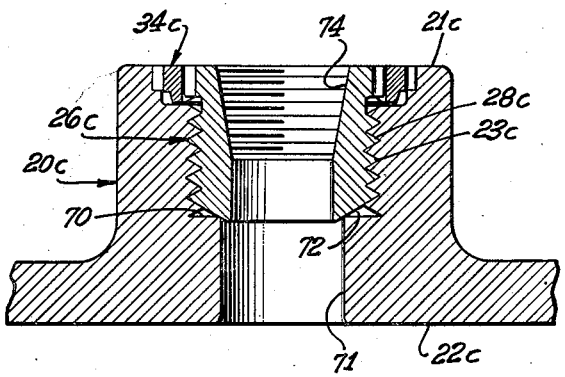
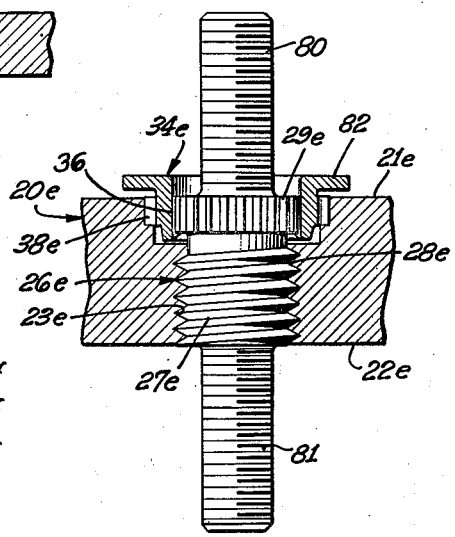
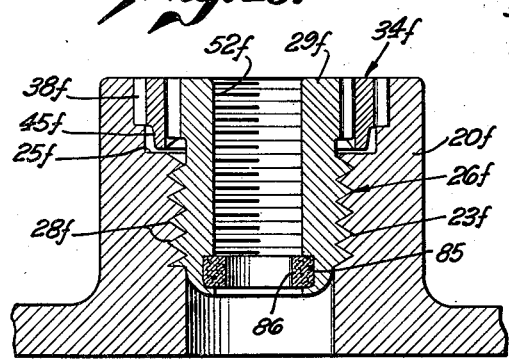
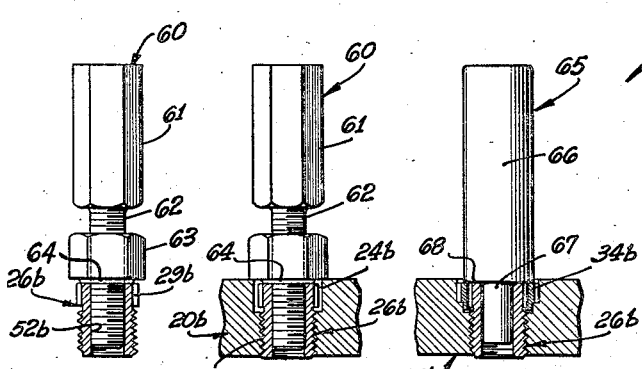
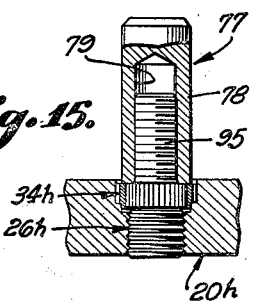
JOSEPH ROSAN,
INVENTOR.
BY
ATTORNEY.

Patented May 14, 1946

2,400,318

UNITED STATES PATENT OFFICE 2,400,318

INSERT

Joseph Rosan, North Hollywood, Calif.

Application November 25, 1942, Serial No. 466,855

24 Claims. (Cl. 85—9)

This invention relates generally to inserts designed for anchorage in bores of bodies of relatively soft materials, for such typical purposes as making various connections with such bodies, plugging holes therein, or as mountings for threaded members, as for instance mountings for spark plugs in aluminum alloy cylinder heads.

Many relatively soft bodies are employed extensively in modern construction, particularly in the aircraft industry, among which are various relatively soft aluminum and magnesium alloys, and various plastics and woods. The problem of providing secure connections or anchorages to such bodies presents a number of difficulties. Particularly in the case of aircraft construction, where the fastening is subject to constant vibratory action, assurance must be provided that the insert will not loosen and fail either by longitudinal displacement or by rotation. Inserts for such purposes as herein indicated have been provided in the past, but have been undesirable for such reasons as insecurity, complexity, cost of manufacture, difficulty of insertion, or time consumed in insertion.

The primary object of the present invention is the provision of an insert capable of forming a permanent anchorage of increased security in a relatively soft body.

A further object is the provision of an insert characterized by a high degree of security, and at the same time of relatively simple and inexpensive construction.

A further object is the provision of an insert, either tubular in form, or a solid plug, adapted to form a fluid tight seal in a bore in a relatively soft body.

Another object is the provision of an insert capable of being inserted with a minimum of difficulty and with minimum consummation of time.

Another object is the provision of a special insert embodying a stud.

A still further object is the provision of an insert adapted to the special purpose of serving as a mounting or adapter for a spark plug in the head of a cylinder which may be composed, for instance, of aluminum or other material in which a simple screw threaded connection does not offer adequate security.

Another object is the provision of an effective process and means for installing the insert provided by the invention.

The present invention, in one of its typical illustrative forms or adaptations, provides an internally and externally threaded tubular insert body adapted to be screwed into a screwthreaded bore in a relatively soft body into which the anchorage is to be made. The outer end of this insert body has a tubular head formed with a plurality of external longitudinal serrations, ribs or ridges, which extend parallel to the axis of the tubular body. The outer face of the body into which the insert is to be introduced is formed with a counterbore of a depth corresponding approximately with the height of this head, being usually slightly deeper than the height of the head. The tubular insert body having been screwed into the bore prepared for it, a locking ring is then pressed or hammered into place in the described counterbore. This locking ring has internal longitudinal serrations, ribs or ridges adapted to mesh with the similar formations on the head of the tubular insert body, and it has specially formed external longitudinal serrations, ribs or ridges designed to impress, cut or broach their way into the material of the body around the periphery of the counterbore. In order to secure this action, the root diameter of the locking ring, at the base or root circle of the external serrations, is made just slightly less than the diameter of the counterbore, so that the serrations must cut their way into the material as the ring is driven in. The longitudinal serrations on the outside of the locking ring thus become embedded in the body, securing the ring against torsional displacement, while the interengaging serrations on the inside of the ring and on the head of the tubular insert secure the latter against torsional displacement. The screwthreaded engagement between the insert body and the relatively soft body is adequate to secure the insert against longitudinal displacement.

A particular feature of the invention is the formation given to the external serrations on the locking ring, by which said serrations have a broaching action on the material of the body around the counterbore, actually cutting material from said body and displacing it ahead of the locking ring. Further features of advantage have to do with the formation of a pilot portion on the inner end of the locking ring, which facilitates insertion, and guides and confines the material cut from the body by the external serrations, and also with the provision of an internal chamfer inside said pilot portion, designed to facilitate further the insertion of the ring.

The invention in some of its present illustrative forms, aspects and adaptations, including additional objects, accomplishments and features not mentioned in the foregoing discussion, will be best understood from the following detailed description of certain selected typical illustrative embodiments thereof, reference for this purpose being had to the accompanying drawings, in which:

Fig. 1 is an enlarged exploded view, in perspective, showing the insert body, locking ring therefor, and the bore in the body into which the insert and locking ring are received;

Fig. 2 is a longitudinal medial section through an insert and locking ring, of the type shown in Fig. 1, in place in a body of material;

Fig. 3 is a still further enlarged fragmentary longitudinal section showing a portion of the locking ring ready to be driven into the counterbore;

Fig. 4 is a view similar to Fig. 3, but showing the locking ring after having been driven into the counterbore;

Fig. 7 is a longitudinal medial section showing a modification;

Fig. 9 is a medial longitudinal section showing a tubular insert body formed with integral studs adapted, for instance, to serve as electrical terminals, and showing further a modified form of locking ring adapted for ready removal from the surrounding body;

Fig. 10 is a longitudinal medial section of a further modified form of the invention, showing the tubular insert body of the invention provided with self-locking means for a stud which may be screwed therewithin;

Fig. 12 is a view, partly in elevation and partly in longitudinal section, showing an insertion tool secured to the tubular insert body;

Fig. 13 is a view, partly in elevation and partly in longitudinal section, illustrating the introduction of the tubular insert body into the relatively soft body by means of the insertion tool;

Fig. 14 is a view, partly in elevation and partly in longitudinal section, showing the manner of introduction of the locking ring with the use of a special drive tool; and Fig. 15 shows the use of a modified drive tool designed for use with an insert having an integral stud.

Corresponding parts of the several illustrative forms of the invention disclosed are identified in the drawings by like reference numerals, but with different sub-letters for different forms.

Figure 5:
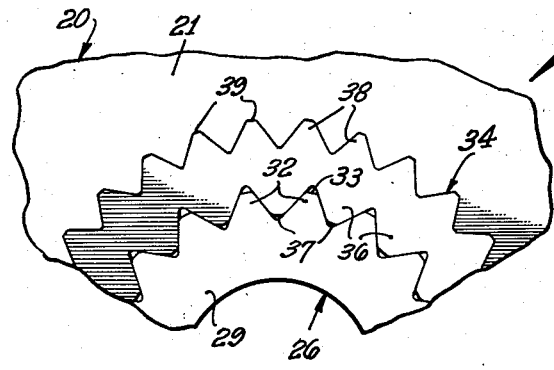
Fig. 5 is a fragmentary top plan view, to enlarged scale, of the insert body and locking ring driven into position into a body of relatively soft material.

With reference first to the illustrative form of the invention disclosed in Figs. 1 through 5, numeral 20 designates generally a body of relatively soft material, such as aluminum or magnesium alloy, plastic, or the like, here shown in the form of a blind boss having an outer surface 21. When I speak of a body of relatively soft material, it will of course be understood that I refer to a body which is of a material softer than that of the insert. The insert, as will presently appear, consists of a body and locking ring, both of which are constructed of some suitable relatively hard material such as mild or heat treated steel, brass, bronze, etc. In the instant form of the invention, the body or boss 20 is formed with a blind screwthreaded bore 23, extending inwardly from its outer surface 21, and with an enlarged counterbore 24 extending inwardly from surface 21 to a predetermined depth, determined as later to be described, said counterbore 24 affording an outwardly facing annular shoulder 25 at its juncture with bore 23.

The insert body, in this instance of generally tubular form, is designated generally by numeral 26, and is provided with an inner portion or section 27 having external screwthreads 28 adapted for engagement with screwthreaded bore 23, and with an outer portion or head 29, of a diameter preferably, though not necessarily, of approximately the same outside diameter as the diameter of inner threaded section 27. In the preferred embodiment of the invention here illustrated, head 29 and threaded section 27 are joined by a short unthreaded neck or thread-relief portion 30. The aforementioned counterbore 24 is drilled to a depth approximately equal to the length of insert head 29, or preferably, and as here illustrated, to a depth slightly greater than the length of head 29 (see Figs. 2 and 4).

Head 29 is formed with external locking formations adapted to inter-engage by relative longitudinal movement with complemental locking formations formed inside a later-described locking ring. In the present preferred form of the invention, the locking formations on head 29 comprise a plurality of parallel serrations, ribs, or ridges 32, disposed parallel to the axis of the tubular insert, and extending entirely around the head. They are preferably, and here shown (see Fig. 5), of substantially triangular formation, as seen in end elevation, and the crests are preferably relieved or slightly rounded, as indicated at 33, so as to avoid sharp edges which might otherwise engage and weaken the mating locking ring. These serrations, ribs or ridges may easily and conveniently be formed with the use of a standard knurling machine, or with the use of a die. A die operation assures uniformity of the product, as well as assuring that the formations will be accurate and uniform, so as to mesh properly with the complemental formations of the locking ring, and is accordingly preferred. Whether or not these serrations are produced by a knurling machine, from their general resemblance to knurling, the head 26 may be referred to generally as being longitudinally knurled.

The locking ring is designated generally in the drawings by the numeral 34. This locking ring has a central bore 35 formed with locking formations adapted to inter-engage or mesh by relative longitudinal movement with the external locking formations on head 29; in the preferred form of the invention, the central bore or aperture 35 of locking ring 34 is formed with a plurality of parallel serrations, ribs or ridges 36, disposed parallel to the longitudinal axis of the ring, and extending entirely around bore 35, being, like serrations 32, of substantially triangular formation, and of size and shape similar to or complemental to the serrations 32. As shown in Fig. 5, the crests of the serrations 36 are preferably relieved or slightly rounded, as at 37, so as to avoid sharp crest edges. Preferably, the inter-engaging serrations 32 on head 29 and 36 in ring 34 are designed and fitted with a slight amount of play or clearance. This clearance is desirable because it facilitates installation and takes care of any misalignments that may occur. The locking ring actually closes in tightly on the head of the insert as it is driven into position, as later described. The internal serrations 36 in locking ring 34 may be formed either by a knurling wheel, or by a broaching operation, broaching being preferred because of the resulting uniformity of the product.

Locking ring 34 is thus adapted to move on over head 29 by relative longitudinal travel, the serrations 32 and 36 of the two members intermeshing to provide a multiple-splined connection positively preventing relative rotation therebetween.

The outer periphery of locking ring 34 is formed with longitudinal locking formations adapted to bite into the material of body 20 around counterbore 24 as the locking ring is moved onto the head 29 of the insert body, the insert body being understood to be first screw-threaded into the bore 23 in the body to the position shown in Figs. 2 and 3. These external locking formations on the locking ring comprise serrations, ribs, or ridges 38, extending longitudinally of the central axis of the ring, and formed entirely around the ring, as illustrated.

The external serrations, ribs or ridges 38 may be and are preferably generally like the previously described serrations 32 on the head of the insert body, excepting for certain presently described preferred modifications. Thus they are generally triangular in shape, as seen in end elevation (see Fig. 5), and their crests are preferably slightly relieved or rounded, as indicated at 39 (Fig. 5). The diameter of the counterbore 24 is made just slightly greater than the diameter of the root circle of the external serrations, so that, excepting for the serrations, the locking ring would slide easily inside the counterbore, and further, so that substantially the entirety of the serrations project outwardly beyond the peripheral defining surface of the counterbore. In the preferred form of Figs. 1-5, the upper ends of the serrations 38 are flush with the upper surface of the ring, whereas the lower ends of said serrations terminate somewhat above the lower surface of the ring. The crest lines 40 of the serrations 38 are preferably straight, and taper very slightly in an upward or outer direction, as indicated with some exaggeration in Figs. 3 and 4. Actually, this taper may be of the order of say half a degree. Thus the ring is provided with a multiplicity of longitudinal serrations or ridges having straight crest portions extending parallel to the axis of the ring, or with very slight taper with relation to said axis. And these serrations are of substantial length, so as to afford substantial lateral surfaces or faces to resist torsional displacement in the body 20.

The inner ends of the external locking ring serrations 38 may be regarded as formed substantially at right angles to the axis of the insert, though they are preferably under-cut at a slight cutting angle or rake, as indicated at 42, so as to increase the effectiveness of the serrations as cutting or broaching elements. The inner ends of the serrations merge with a curved inwardly swept surface 43 extending inwardly into the body of the ring inside the root circle of the serrations and merging in turn with a slightly inwardly tapering surface 44 which meets with the bottom surface of the ring. The surface 44 below serrations 38 defines a pilot portion 45 at the lower end of the ring which is adapted to enter the counterbore 24 ahead of the serrations 38, permitting the serrations 32 and 36 on the insert head and inside the ring, respectively, to go easily into mesh prior to engagement of the serrations 38 with the material of body 20. The reduced pilot portion 45 of the ring also provides a suitable clearance space 46 for the material severed from body 20 by the cutting ends of serrations 38 (see Fig. 4).

The bore 35 of locking ring 34 is preferably formed with a chamfer 47 at the bottom of the ring, the depth of the chamfer preferably corresponding with the depth of serrations 36, as clearly appears in Figs. 3 and 4.

The locking ring is preferably of a thickness somewhat greater than the length of insert head 29, and the counterbore 24 is cut to a depth preferably somewhat greater than the thickness of the ring, so that the ring when driven home to locking position is slightly spaced above shoulder 25.

The procedure involved in installing the insert is as follows: The insert body is first screwed into the tapped bore 23 in body 20 until its head is substantially flush with, or say .01" below, the outer surface 21 of the body 20. Locking ring 34 is then engaged with the head 29 of the insert body, the chamfer 47 on the inside of the pilot portion 45 of the ring guiding the ring onto the head. As these serrations first go into mesh, the untoothed pilot section 45 of the locking ring is entering counterbore 24 and the external locking ring serrations 38 are not yet in engagement with the body 20, so that the serrations of the ring are enabled to mesh easily and properly with those of the head 29. The locking ring having thus been given a lead on head 29, the lower cutting ends of the external serrations 38 then come into engagement with the material of body 20 outside or around the peripheral surface of counterbore 24; and thereafter, as the locking ring is pressed or hammered home, enter into the material of the body 20 by a cutting or broaching action. Fig. 3 shows the locking ring after having been given its lead on the head of the insert body, and with the inner, cutting ends of its serrations 38 in engagement with the upper surface 21 of body 20, around counterbore 24. Fig. 4 shows the locking ring after it has been pressed or hammered into locking position, and indicates at 50 the chip of material which has been cut from body 20 by a serration 38, this chip having been turned downwardly by the pilot portion 45 on the locking ring, and being received within the clearance space 46 provided for it. The action of the serrations 38 in thus cutting their way into the material of the body 20 around the counterbore is thus a broaching action, material being actually removed from the body and being forced downwardly and confined within the clearance space 46, as indicated at 50. The previously described slight taper given to the crests of the serrations 38 materially reduces the drag as the ring is being driven home and thus facilitates introduction. An interesting and highly important effect which occurs as the ring is driven into place is a gradual compression or contraction of the locking ring, the material of the body 20 exerting a substantial normal or lateral pressure on the serrations 38 of the ring as the cut is made, which pressure is sufficient to compress or contract the ring sufficiently to take up the play initially provided between the ring and the head 29 of the insert body, and thus cause the ring to close tightly on and hug the head 29. Largely by virtue of this effect, the locking ring is tightly gripped by the material of the body, or wedged between said material and the head 29, and does not tend to loosen or to become displaced in a longitudinal direction even after long periods of use under conditions of substantial vibration.

The serrations 38 of the locking ring, thus cut and embedded into the body 20, and frictionally gripped by the surfaces of the body cut by the serrations themselves, which frictional grip is enhanced by the lateral pressure exerted by the body itself, provide the locking ring with a multiple-splined engagement with the body which positively prevents relative rotation between ring and body, and at the same time, anchor the locking ring very tightly against longitudinal displacement. Thus the head 29 and the locking ring 34 jointly constitute a flange extending radially from the shank 26 and having peripheral serrations 38 imbedded in the body of material 20 to resist rotation of the insert as a whole. Moreover, because of the described lateral pressure exerted on the ring by the body, which effect is actually sufficient to contract the ring tightly about insert head 29, taking up the slight play initially provided between the ring and said head 29, there is assurance that the ring will not become loosened even after long periods of service. The multiple-splined connection between the locking ring and the head 29 of the insert body of course positively locks the locking ring and insert body against relative rotation, while the screwthreaded connection between the section 27 of the insert body and the bore 23 of body 20 is adequate to withstand heavy strains in directions axially of the insert.

In the form of the insert disclosed in Figs. 1 to 5, the insert body 26 is shown to have a central screwthreaded bore 52, adapted to receive a screwthreaded stud or other anchorage member. And, of course, the threads inside the tubular insert body may be of any desired type, either straight or tapered, such as may be called for by the problem in hand. The insert may be made up in a wide range of sizes, being adaptable to relatively minute scale, for instrument purposes, or equally well to relatively large sizes. And it will of course be evident that, the tubular insert body 26 being locked securely against torsional displacement by the locking ring, and against longitudinal displacement by its screwthreaded engagement with the body 20, any such member such as a stud or the like screwthreaded within the bore 52 of the insert body will likewise be securely anchored to the body 20 against both torsional and longitudinal displacements.

Figure 6:
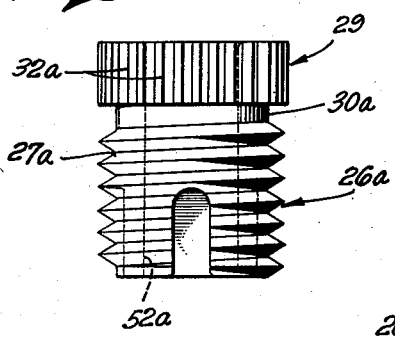
Fig. 6 is an elevation of a modified insert body, having self-tapping external threads.

In Fig. 6 there is illustrated a modified tubular insert body 26a, which is similar to the tubular insert 26 of Figs. 1 to 5, with the sole exception that its threaded inner section 27a has self-tapping characteristics for the purpose of engagement with an unthreaded bore in wood or other materials of like characteristics. In such a situation, the body into which the insert is to be mounted is simply formed with a straight, unthreaded bore, or the bore may have one or two starting threads, and the self-tapping threads on the insert body form the desired screwthreaded connection with the bore as the insert is screwed into position.

Reference is now directed to Figs. 12, 13 and 14, illustrating a preferred procedure and instrumentalities for installing the insert. In Fig. 12, numeral 60 designates generally an insertion tool for the tubular insert body 26b, which insert body is shown to be essentially the same as the insert body 26 of Figs. 1 to 5. Tool 60 comprises a head or handle 61 and a threaded shank 62 carrying a nut 63, shank 62 being adapted for engagement within the threaded bore 52b of the insert body, and nut 63 being shown as provided with a round boss 64 adapted to engage the head of the insert body, said boss 64 being of a diameter less than the diameter of counterbore 24b (see Fig. 13). Shank 62 is screwed into the insert body to a position as shown, it being important that the shank engage at least 75% of the threads within the insert, and nut 63 is then turned to tighten nut boss 64 against insert head 29b. The insert body 26b is then screwed into the bore 23b in the body 20b, shown in the instance of Fig. 13 to comprise a wall with the bore 23b opening through its inner face. The boss 64 being receivable inside counterbore 24b, the head of the insert may be set slightly below a flush position, if desired. Fig. 13 illustrates the completion of the last-described step, the insert body being screwed into bore 23b until nut 63 engages the outer face of body 20b. Nut 63 is then loosened and the tool 60 removed from the insert body. Locking ring 34b is then located on the top of insert head 29b, and a drive tool 65 applied. The latter comprises, illustratively, a cylindrical body 66 having a co-axial locating pin 67 extending from one end thereof, pin 67 being dimensioned to be received with an easy sliding fit within the central bore of the insert body. The downwardly facing annular shoulder 68 at the juncture of pin 67 with body 66, which is preferably of a diameter less than that of the counterbore in the body into which the insert is being introduced, engages the upper face of the locking ring, inside its external serrations. The locking ring is then driven or pressed into flush position, or slightly below, by applying force to the drive tool 65, using a hammer or a press. Other instrumentalities may of course be devised or utilized for installation of the insert body and locking ring, though those described have been specifically designed for the purpose and are preferred.

The insert can be removed by drilling to a depth equal to the thickness of the locking ring, with a drill equal in diameter to that of the serrations between the ring and the insert body. The insert body is then removed with an "easy-out" tool.

Fig. 14 is also illustrative of a modified application of the insert, in that the bore for the insert body extends entirely through the relatively soft body into which the insert is introduced. Thus the body 20b is in the form of a wall, rather than a blind boss as in Figs. 1 and 2. The situation shown in Fig. 14 is illustrative of many practical adaptations of the invention. It is illustrative, for example, of the use of the insert as an adapter for mounting a spark plug in the head of a cylinder composed of aluminum or the like, into which a spark plug cannot be directly screwed because of a tendency to loosen.

In Fig. 7 is illustrated a modification, in which the relatively soft body 20c has exterior and interior faces 21c and 22c, and in which the tubular insert body 26c terminates short of inside face 22c, its inner end engaging and forming a fluid-tight seal with the edge of an annular outwardly facing shoulder 70 formed on body 20c at the inner end of tapped bore 23c, which is terminated short of the inside face 22c of the body. As illustrated, a reduced bore 71 extends from shoulder 70 on through surface 22c. The inner end of insert body 26c is provided with a wedge formation 72, which is engageable with the edge of shoulder 70 and is adapted to deform or impress itself somewhat into said shoulder so as to form a fluid-tight seal between the insert body and body 20c, as will be understood. The insert body is again illustrated to be of tubular form, and is shown as provided with internal pipe threads 74. The locking ring 34c and associated provisions are as described in connection with Figs. 1 to 5, as will be apparent.

Figure 8:
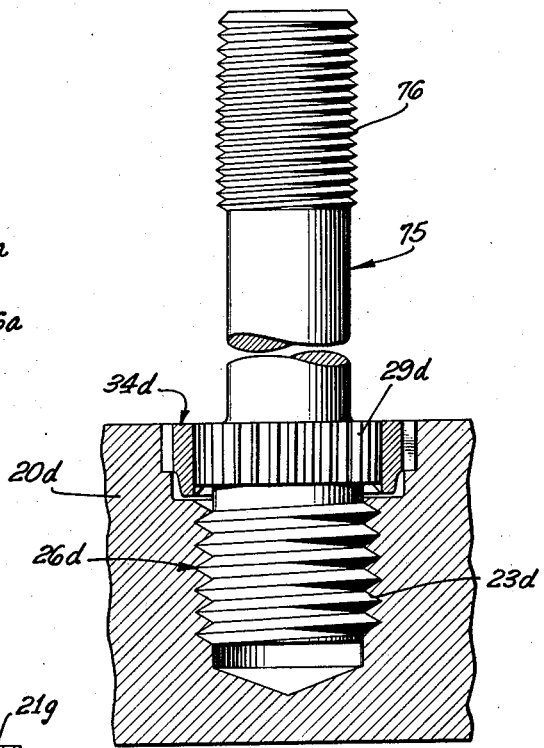
Fig. 8 is a medial longitudinal section showing a modified insert body formed with an integral stud.

In Fig. 8 is illustrated a form of the invention in which the insert body, designated generally by numeral 26d, is solid rather than tubular, and is provided with an integral externally projecting shank or stud 75, the latter being provided with screwthreads 76. The insert is shown as installed in a body 20d, and a locking ring 34d, of the same type as before described, engages head 29d of the insert body and locks said head against relative rotation in body 20b, all in the manner described hereinbefore. The invention in this form thus securely anchors the head end of a stud 75 to a body of relatively soft material, and connections of any kind desired may be made to said stud.

Fig. 15 shows a modified drive tool 77 designed for driving in the locking ring when the insert body 26h has an integral stud 95. The drive tool 77 comprises a cylindrical body 78 having a socket 79 adapted to receive the stud portion of the insert. The socketed end of the tool is dimensioned to engage the locking ring inside the root circle of its external serrations, as will be evident. The use of this modified drive tool will be clear without further description.

Fig. 9 illustrates several modifications of the form of the invention shown in Fig. 8. The insert body, designated by numeral 26e, is again solid rather than tubular, and it has an integral stud 80 projecting axially from its longitudinally serrated head 29e, and an integral stud 81 projecting axially from the inner end of its threaded section 27e. The relatively soft body 20e, in this instance, has exterior and interior surfaces 21e and 22e, respectively, and the threaded bore 23e opens through interior face 22e. Locking ring 34e will be understood to have the same characteristics as the locking ring 34 of Figs. 1 to 5, having internal longitudinal serrations adapted to mesh with the serrations of head 29e, and external serrations 38e, but in addition is provided with an integral flange part 82 which, when the locking ring is driven home, is spaced somewhat above the upper face 21e of body 20e, as shown. This flange provides a part under which a prying tool may be engaged to remove the locking ring from the body 20e. It will of course be evident that such a flange may be provided on any of the locking rings, if desired. The studs 80 and 81 may serve any desired purposes; for instance, assuming the body 20e to be of a material having electrical insulation properties, the studs 80 and 81 may be designed and employed as electrical terminals. It will of course be evident that either the inside stud 81, or the outside stud 80, may be omitted, as requirements dictate, and by omission of both the studs, the solid insert body 26e becomes simply a solid plug, such as may be employed as a closure for an opening which extends through the body 20e.

Fig. 10 shows a tubular insert body 26f introduced into a tapped bore 23f in a body 20f of relatively soft material, the insert body being provided with the usual head 29f locked in body 20f against torsional displacement by means of locking ring 34f. These parts are all of the same general form and characteristics as the corresponding members of Figs. 1 to 5. Additionally, the tapped bore 52f in the insert body terminates at an annular groove 85 in which is seated an elastic washer 86, formed preferably of fiber or other suitable material, into which the threaded anchorage member or stud (not shown) which is to be screwed into bore 52f may impress itself and so become automatically self-locked.

Figure 11:
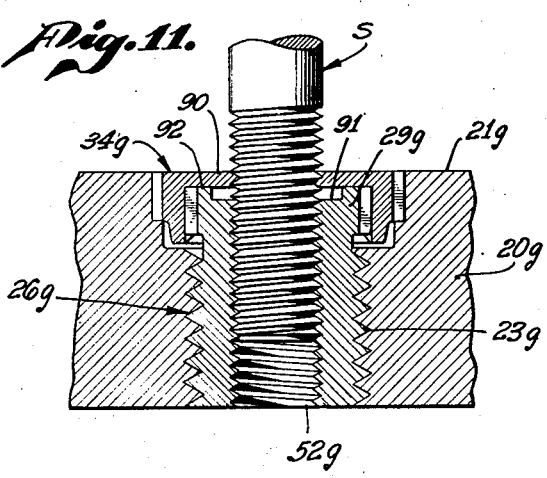
Fig. 11 is a longitudinal medial section showing a modified form of stud locking means.

Fig. 11 shows a modified arrangement for locking the stud within the insert. In this instance, the serrated head 29g of insert body 26g is somewhat shortened, so that the outer end of the insert lies somewhat below the outer face 21g of body 20g, when the insert is home, and in which the locking ring 34g is formed with an inwardly projecting annular flange portion 90 which is formed with a central screwthreaded bore, of the same diameter and thread size and pitch as the tapped bore 52g of the tubular insert body 26g. The head of the insert body is formed with a counterbore 91, so as to leave an annular clearance space between flange 90 and the end of the insert body, inside rim 92. Otherwise, the insert body 26g, as well as the locking ring 34g, may be the same as the corresponding parts of Figs. 1 to 5. The threaded anchoring member or stud S, engaging both the threads of bore 52g and of the central bore in flange 90, operates to deflect the flange 90 slightly in a longitudinal direction, when screwed tightly home in bore 52g, and so becomes cramped or bound by the two sets of threads, and thus locked in position.

In each of the above given illustrations, the external serrations on the locking ring are formed and employed as broaching elements to cut grooves or paths in the relatively soft material for the serrations. In some situations it may be desirable to prepare the grooves in the body in advance, using a special broach, and then to drive the serrated locking ring into the prepared grooves. In such cases, it is usually desirable to make the locking ring slightly oversize for the space provided for it, or at least to provide a very snug or tight fit. The ring being then driven into position, it is tightly wedged in place, and not susceptible to loosening. It will of course be understood that the particular cross-sectional form of the serrations as here indicated is not at all limitative on the invention, and that such form may be approximately triangular, with slightly relieved edges, as herein depicted, or any other, as may be found suitable. The final function being the provision of a secure multiple-splined connection, a serration of any cross-section, whether triangular or otherwise, may be adopted within the broad scope of the invention.

It will be understood that the drawings and description are merely illustrative of the invention in several of its present illustrative forms and adaptations, and that various changes in design, structure and arrangement may be made without departing from the spirit and scope of the invention or of the appended claims.

This application is a continuation, in part, of and substitute for my original application entitled Insert, Serial No. 445,472, filed June 2, 1942.

I claim as my invention:

1. In an insert adapted for connection with a body of material having a surface, the combination of an insert body having an inner externally screwthreaded section adapted to be screwed into a bore extending into said body of material from its said surface and having a head at its outer end, and a locking ring receivable in a counterbore sunk in said surface coaxially of said bore, said ring and head incorporating means for securing said ring and head against relative rotation, and a multiplicity of longitudinal serrations formed on the external periphery of said locking ring, said serrations having longitudinal crest lines of substantial length formed substantially parallel to the central longitudinal axis of said ring, said serrations being engageable with and adapted to broach grooves in said body of material around said counterbore to lock said ring against rotation therein, and said serrations terminating short of said inner end of said ring, so as to form the inner end of the ring with a pilot portion adapted to enter said counterbore ahead of said serrations.

2. In an insert adapted for connection with a body of material having a surface, the combination of an insert body having an externally screwthreaded section adapted to be screwed into a bore extending into said body of material from its said surface and having a head on its outer end, and a locking ring receivable in a counterbore in said body of material formed coaxially of said bore, means acting between said head and ring to prevent relative rotation thereof, and the outer periphery of said ring having longitudinally extended serrations spaced circumferentially therearound and extending parallel to the axis of the ring, said serrations terminating short of the inner end of said ring, whereby a pilot portion of the ring may enter the counterbore ahead of the serrations, and said serrations being engageable with and adapted to broach grooves in said body of material around said counterbore to lock said ring against rotation therein.

3. In an insert adapted for connection with a body of material having a surface, the combination of an insert body having an inner externally screwthreaded section adapted to be screwed into a bore extending into said body of material from its said surface and having a head at its outer end, and a locking ring having a central aperture adapted to receive said head by relative axial movement, said locking ring and head being adapted to become locked against relative rotation when said head is received within said ring, said ring being receivable in a counterbore sunk in said surface coaxially of said bore, and a multiplicity of longitudinal serrations formed on the external periphery of said locking ring, said serrations having longitudinal crest lines of substantial length formed substantially parallel to the central longitudinal axis of said ring, the inner ends of said serrations being formed at angles substantially at right angles to the axis of the ring, and being engageable with and adapted to cut chips from the body of material around said counterbore as said ring is forced within said counterbore, and said serrations terminating short of said inner end of said ring, so as to form the inner end of the ring with a pilot portion adapted to enter said counterbore ahead of said serrations.

4. An insert as defined in claim 3, in which the central aperture of the locking ring is formed with a chamfer at the inner end of the ring.

5. A locking ring having inner and outer ends and a central aperture, longitudinal locking serrations formed within said aperture, and longitudinal locking serrations formed on the external periphery of said ring, said last-mentioned serrations terminating short of said inner end of said ring, so as to form said ring with a pilot portion at its said inner end.

6. A locking ring having inner and outer ends and a central aperture, longitudinal locking serrations formed within said aperture, and longitudinal locking serrations formed on the external periphery of said ring, said last mentioned serrations terminating short of said inner end of said ring, so as to form said ring with a pilot portion at its said inner end, and the inner end portions of said serrations being formed at acute cutting angles.

7. A locking ring having inner and outer ends and a central aperture, longitudinal locking serrations formed within said aperture, and longitudinal locking serrations formed on the external periphery of said ring, said last-mentioned serrations terminating short of said inner end of said ring, so as to form said ring with a pilot portion at its said inner end, and said ring having an internal chamfer at the inner end of its said central aperture.

8. A locking ring having inner and outer ends and a central aperture, longitudinal locking serrations formed within said aperture, and longitudinal locking serrations formed on the external periphery of said ring, said last-mentioned serrations terminating short of said inner end of said ring, so as to form said ring with a pilot portion at its said inner end, and said outer end of said ring having extending therefrom an integral flange portion spaced from said outer end and by which said ring may be pried from locking engagement with a body of material.

9. In an insert adapted for connection with a body of material, the combination of an insert body having an externally screw threaded section adapted to be screwed into a bore in said body of material and having a head on its outer end, and a locking ring having a central aperture adapted to receive said head, said head and central aperture having locking formations adapted to lock said insert body and ring against relative rotation, said locking ring being receivable in a counterbore in said body of material formed coaxially of said bore, and the periphery of said locking ring having longitudinal serrations extended in directions substantially parallel to the axis of the ring and adapted to enter into locking engagement with the wall of said body around said counterbore to lock said ring against rotation in said body, said serrations terminating short of the inner face of said ring, so as to form the inner portion of said ring with a reduced pilot means adapted to enter said counterbore ahead of said serrations.

10. A locking ring having inner and outer ends and a central aperture, longitudinal locking formations formed within said aperture engageable with complemental locking formations on an element received in said central aperture by relative axial movement therebetween, and longitudinal locking serrations formed on the external periphery of said ring, said last-mentioned serrations terminating short of said inner end of said ring, so as to form said ring with a pilot portion at its said inner end.

11. A locking ring having inner and outer ends and a central aperture, longitudinal locking formations formed within said aperture engageable with complemental locking formations on an element received in said central aperture by relative axial movement therebetween, and longitudinal locking serrations formed on the external periphery of said ring, said last-mentioned serrations terminating short of said inner end of said ring, so as to form said ring with a pilot portion at its said inner end, and the inner end portions of said serrations being formed at acute cutting angles.

12. A locking ring having inner and outer ends and a central aperture, longitudinal locking formations formed within said aperture engageable with complemental locking formations on an element received in said central aperture by relative axial movement therebetween, and longitudinal locking serrations formed on the external periphery of said ring, said last-mentioned serrations terminating short of said inner end of said ring, so as to form said ring with a pilot portion at its said inner end, and said ring having an internal chamfer at the inner end of its said central aperture.

13. A locking ring having inner and outer ends and a central aperture, longitudinal locking formations formed within said aperture engageable with complemental locking formations on an element received in said central aperture by relative axial movement therebetween, and longitudinal locking serrations formed on the external periphery of said ring, said last-mentioned serrations terminating short of said inner end of said ring, so as to form said ring with a pilot portion at its said inner end, and said outer end of said ring having extending therefrom an integral flange portion spaced from said outer end and by which said ring may be pried from locking engagement with a body of material.

14. In an insert adapted for connection with a body formed with a screwthreaded and counterbored socket, the combination of a cylindrical body having an externally screwthreaded inner extent adapted for engagement with said screwthreaded socket and with an outer extent comprising a head adapted to be disposed within the counterbore, a locking ring receivable coaxially in said counterbore and formed with a multiplicity of external broaching serrations extended longitudinally with respect to its axis and having a root diameter only slightly less than that of the counterbore so that substantially the entirety of said broaching serrations lie outside said counterbore, the inner ends of said serrations comprising cutting elements adapted to broach grooves in the walls of said counterbore when said locking ring is forced axially inwardly thereof, and interengaging formations on said head and ring adapted to mesh by such axial inward movement of said ring and to secure said ring and insert body against relative rotation.

15. In an insert adapted for connection with a body formed with a screwthreaded and counterbored socket, the combination of a cylindrical body having an externally screwthreaded inner extent adapted for engagement with said screwthreaded socket and with an outer extent comprising a head adapted to be disposed within the counterbore, a locking ring receivable coaxially in said counterbore and formed with a multiplicity of external broaching serrations extended longitudinally with respect to its axis and having a root diameter only slightly less than that of the counterbore so that substantially the entirety of said broaching serrations lie outside said counterbore, the inner ends of said serrations lying substantially in a plane at right angles to the axis of the ring and comprising cutting elements adapted to broach grooves in the walls of said counterbore when said locking ring is forced axially inwardly thereof, and interengaging formations on said head and ring adapted to mesh by such axial inward movement of said ring and to secure said ring and insert body against relative rotation.

16. In an insert adapted for connection with a body formed with a screwthreaded and counterbored socket, the combination of a cylindrical body having an externally screwthreaded inner extent adapted for engagement with said screwthreaded socket and with an outer extent comprising a longitudinally serrated head adapted to be disposed within the counterbore and having a diameter less than that of the counterbore, and a locking ring having an internally longitudinally serrated bore axially slidable over and adapted to mesh with said serrated head, the serrations on said head and in said ring being adapted both to guide said ring in axial movement into said counterbore and to lock said ring and insert body against relative rotation, said locking ring being formed with a multiplicity of external broaching serrations extended longitudinally with respect to its axis and having a root diameter only slightly less than that of the counterbore so that substantially the entirety of said broaching serrations lie outside said counterbore, the inner ends of said serrations comprising cutting elements adapted to broach grooves in the walls of said counterbore when said locking ring is forced axially inwardly thereof.

17. An insert as defined in claim 16, in which the internally serrated locking ring is sized to fit the serrated head of the insert body initially with a relatively free fit, and tends to contract about said head by reason of reaction of the material of the body on the broaching serrations of the ring as the ring is forced into the counterbore.

18. In an insert adapted for connection with a body having a screwthreaded and counterbored socket therein, the combination of: a cylindrical shank of substantially uniform diameter, said shank having external screwthreads occupying the major portion of its length to engage the screwthreads of said socket and longitudinally directed serrations occupying at least part of the remaining portion of its length, said serrations and threads having substantially the same root and peak diameters; and a locking ring having internal serrations mating the serrations of said shank, and external broaching serrations adapted to be forced into the walls of said counterbore to lock said shank against rotation.

19. In an insert adapted for connection with a body having a screwthreaded and counterbored socket therein, the combination of: a shank having external screwthreads occupying the major portion of its length adapted to fit the screwthreads of said socket and longitudinally directed external serrations occupying a minor portion of its length and adapted to be disposed opposite said counterbore; and a locking ring having internal serrations mating and freely slidable on the serrations of said shank, and external broaching serrations adapted to be forced into the walls of said counterbore while being guided by said mating serrations to lock said shank against rotation.

20. In a removable insert adapted for connection with a body having a screwthreaded and counterbored socket, the combination of: a shank having external screwthreads occupying the major portion of its length adapted to fit the screwthreads of said socket and axially directed external serrations occupying a minor portion of its length adapted to be disposed opposite said counterbore; a locking ring having internal serrations mating and freely slidable on the serrations of said shank, and external broaching serrations adapted to be forced into the walls of said counterbore while being guided by said mating serrations to lock said shank against rotation, said shank and ring adapted to be severed by destruction of said mating serrations; and means incorporated with said shank forming a guide during destruction of said mating serrations and available for engagement by a tool upon severance of said shank from said ring to effect removal of the shank.

21. In an insert adapted for connection with a body having a screwthreaded and counterbored socket therein, the combination of: a cylindrical shank of substantially uniform diameter and provided with external screwthreads adapted to fit the screwthreads of said socket and a series of serrations positioned for torque resisting engagement; and a locking ring including serrations mating the serrations of said shank, external axially directed broaching elements on said ring adapted to broach the walls of said counterbore; and a pilot means to guide said broaching elements into broaching position.

22. In an insert adapted for connection with a body having a screwthreaded and counterbored socket therein, the combination of: a shank including an externally screwthreaded portion fitting the screwthreads of said socket, and torque resisting means at its outer portion; and a locking ring including torque resisting means mating said means of the shank, axially directed broaching elements on said ring adapted to broach the walls of said counterbore; and a pilot means to guide said elements into broaching position.

23. A locking ring for inserts having a rotation locking head, comprising: locking serrations formed on the external periphery of said ring and terminating short of an axial end of said ring to form a pilot portion for guiding said ring into an aperture having walls engageable by said serrations; and locking means engageable with said head to secure said head against rotation relative to said locking ring.

24. A locking ring having inner and outer ends and a central aperture, locking formations formed on said locking ring engageable with complemental locking formations on an insert element axially aligned therewith by relative axial movement therebetween, and longitudinal broaching and locking serrations formed on the external periphery of said ring, said last-mentioned serrations being relieved short of said inner end of said ring, so as to form said ring with a pilot portion at its said inner end.

JOSEPH ROSAN.